US012038973B2

(12) United States Patent
Ishii et al.

(10) Patent No.: US 12,038,973 B2
(45) Date of Patent: Jul. 16, 2024

(54) RELATION VISUALIZING APPARATUS, RELATION VISUALIZING METHOD AND PROGRAM

(71) Applicant: NIPPON TELEGRAPH AND TELEPHONE CORPORATION, Tokyo (JP)

(72) Inventors: Yoko Ishii, Tokyo (JP); Momoko Nakatani, Tokyo (JP); Ai Nakane, Tokyo (JP); Yumiko Matsuura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 6 days.

(21) Appl. No.: 17/791,847

(22) PCT Filed: Jan. 17, 2020

(86) PCT No.: PCT/JP2020/001496
§ 371 (c)(1),
(2) Date: Jul. 8, 2022

(87) PCT Pub. No.: WO2021/144961
PCT Pub. Date: Jul. 22, 2021

(65) Prior Publication Data
US 2023/0032564 A1 Feb. 2, 2023

(51) Int. Cl.
*G06F 16/901* (2019.01)
*G06F 16/9035* (2019.01)

(52) U.S. Cl.
CPC ...... *G06F 16/9024* (2019.01); *G06F 16/9035* (2019.01)

(58) Field of Classification Search
CPC .................. G06F 16/9024; G06F 16/9035
See application file for complete search history.

(56) References Cited

U.S. PATENT DOCUMENTS 9,449,050 B1* 9/2016 Molina ............. G06F 16/24578
2012/0156660 A1* 6/2012 Kwon ..................... G09B 5/06
434/185

(Continued)

FOREIGN PATENT DOCUMENTS

JP 2019117457 A 7/2019

OTHER PUBLICATIONS

Masataki et al. (2007) "VoiceRex—Spontaneous speech recognition technology for contact-center conversations", NTT Technical Review, vol. 5, No. 1, pp. 22-27.

(Continued)

*Primary Examiner* — Cheyne D Ly

(57) ABSTRACT

A relation visualizing apparatus to an embodiment includes a memory; and a processor configured to: receive, as an input, dialog content data representing a content on which two or more persons have had a dialog with respect to predetermined two or more topic items and generate a graph, composed of nodes and edges, by using the topic items as the nodes and utterer IDs identifying persons having given utterance to two topic items different from each other as the edges, the edges connecting nodes corresponding to the two topic items; and display the generated graph.

6 Claims, 13 Drawing Sheets

(56) References Cited

U.S. PATENT DOCUMENTS

| | | | |
|---|---|---|---|
| 2016/0086601 A1* | 3/2016 | Chotimongkol | G10L 15/197 |
| | | | 704/257 |
| 2016/0307570 A1* | 10/2016 | Mizumoto | G10L 17/02 |
| 2017/0039233 A1* | 2/2017 | Gauthier | G06F 3/0482 |
| 2018/0024989 A1* | 1/2018 | Bharti | H04N 21/8405 |
| | | | 704/9 |
| 2019/0189123 A1* | 6/2019 | Sugiyama | G10L 15/22 |

OTHER PUBLICATIONS

Le et al. (2014) "Distributed Represenations of Sentences and Documents" Proceedings of the 31st International Conference on Machine Learning, Beijing, China.

\* cited by examiner

| TOPIC ITEM GROUP | TOPIC ITEM | UTTERER ID | HOSTING ID |
|---|---|---|---|
| ORDINARY ACTION | GIVE ORIGAMI PAPER | P001 | H002 |
| ORDINARY ACTION | GO TO CAMP | P001 | H002 |
| REASON FOR ORDINARY ACTION | WANT TO NURTURE INTELLECT | P001 | H002 |
| FUTURE GOAL | WANT CHILD TO BE CREATIVE PERSON | P001 | H002 |
| ... | ... | ... | ... |

UTTERER ID and HOSTING ID columns: DIALOG CONTENT DATA

| UTTERER ID | SEX | AGE | MARRIAGE | CHILD | RESIDENTIAL REGION |
|---|---|---|---|---|---|
| P001 | FEMALE | 30 | YES | 0 | TOKYO |
| P002 | MALE | 29 | YES | 1 | TOKYO |
| P003 | MALE | 31 | YES | 2 | TOKYO |
| P004 | FEMALE | 28 | NO | 0 | OSAKA |
| ... | ... | ... | ... | ... | ... |

UTTERER INFORMATION DATA (AGE, MARRIAGE, CHILD, RESIDENTIAL REGION)

| HOSTING ID | HOSTING DATE | NUMBER OF TIMES OF HOSTING | HOSTING PLACE |
|---|---|---|---|
| H001 | 2019/10/21 | 2 | YOKOSUKA |
| H002 | 2019/10/21 | 3 | MUSASHINO |
| H003 | 2019/10/23 | 1 | TSUKUBA |
| H004 | 2019/10/23 | 1 | MUSASHINO |
| ... | ... | ... | ... |

HOSTING INFORMATION DATA (columns: NUMBER OF TIMES OF HOSTING, HOSTING PLACE)

| CATEGORY | NAME | PLACE | |
|---|---|---|---|
| PARK | ○○PARK | ○○ KU, TOKYO | ⎫ REGIONAL |
| PARK | △○PARK | △○ KU, TOKYO | ⎬ INFORMATION |
| PARK | □○PARK | □○ KU, TOKYO | ⎭ DATA |
| MUSEUM | ○○MUSEUM | ○○CITY, CHIBA | |
| ... | ... | ... | |

ABSTRACT

RELATION VISUALIZING APPARATUS, RELATION VISUALIZING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/001496, filed on 17 Jan. 2020, the disclosure of which is hereby incorporated herein by reference in its entirety.

TECHNICAL FIELD

The present invention relates to a relation visualizing apparatus, a relation visualizing method, and a program.

BACKGROUND ART

In the related art, there has been known a speech recognition technique for automatically converting dialog contents of a person into text in real time (for example, see NPL 1).

CITATION LIST

Non Patent Literature

NPL 1: H. Masataki, D. Shibata, Y. Nakazawa, S. Kobashikawa, A. Ogawa, K. Ohtsuki, "VoiceRex—Spontaneous speech recognition technology for contact-center conversations", NTT Tech. Rev., 5 (2007) 22-27.

SUMMARY OF THE INVENTION

Technical Problem

However, in the related art described above, when there are a plurality of topics for a dialog, it is difficult to immediately read relation between these topics from textual information (text) or the like.

An embodiment of the present invention has been made in view of the above-described circumstances, and an object thereof is to visualize relation between topics in a dialog.

Means for Solving the Problem

To achieve the above object, a relation visualizing apparatus according to an embodiment includes: a graph generation unit configured to receive, as an input, dialog content data representing a content on which two or more persons have had a dialog with respect to predetermined two or more topic items and generate a graph, composed of nodes and edges, by using the topic items as the nodes and utterer IDs identifying persons having given utterance to two topic items different from each other as the edges, the edges connecting nodes corresponding to the two topic items; and a display unit configured to display the graph generated by the graph generation unit.

Effects of the Invention

It is possible to visualize relation between topics in a dialog.

BRIEF DESCRIPTION OF DRAWINGS

FIG. 2 is a diagram illustrating an example of dialog content data.

FIG. 3 is a diagram illustrating an example of utterer information data.

FIG. 4 is a diagram illustrating an example of hosting information data.

FIG. 10 is a diagram illustrating an example of a regional information DB.

DESCRIPTION OF EMBODIMENTS

Hereinafter, an embodiment of the present invention will be described. In the present embodiment, a relation visualizing apparatus 10 that visualizes relation between topics in a dialog will be described. The relation visualizing apparatus 10 according to the present embodiment uses dialog data extracted from a scene in which two or more persons are having a dialog to visualize relation between topics in this dialog with a graph (for example, a Sankey diagram, or the like) that is composed of edges and nodes.

In the present embodiment, as an example, a dialog scene is assumed in which cards (hereinafter, also referred to as "topic item cards") each having a topic item described with respect to a topic for which a dialog is conducted (hereinafter, also referred to as a "dialog subject") are prepared in advance, and two or more persons give utterance with each other to a topic item of which card is in close to his/her mood. Here, the topic item means an item that represents a topic. Each topic item belongs to any of one or more topic item groups set in advance.

Specifically, for example, when the dialog subject is "parenting", as the topic item group, "ordinary action", "purpose of action", "future goal", and the like are considered to be set. As topic items that belong to the topic item group "ordinary action", for example, "go to a park," "give origami paper, "show child program," and the like are considered. As topic items that belong to the topic item group "purpose of action", for example, "want to develop intellect", "want to develop sensitivity", "want to improve curiosity and aggressiveness", and the like are considered. As topic items that belong to the topic item group "future goal", for example, "want a child to be creative person", "want a child to be person who does a thing that he/she wants to do without minding his/her surroundings", "want a child to have many life choices and select one by himself/herself", and the like are considered.

Furthermore, in the dialog scene described above, it is assumed that two or more topic items are talked about in one dialog. At this time, the relation between the topic items talked about in the one dialog is not particularly limited. For example, the topic items may be topic items that are likely to have high relation, such as "go to an aquarium" and "go to a zoo", or may be topic items that are likely to have low relation, such as "go to a park" and "want to develop intellect". That is, in one dialog, any two or more topic items only need be talked about. In addition, a topic item (a topic item card) may be added during the dialog.

Note that what topic item cards are utilized (that is, selection of topic item cards) is associated with an animated dialog, and thus, for example, it is conceivable to perform a preliminary survey related to dialog subjects and select a topic item having many responses.

Overall Configuration

Figure 1:
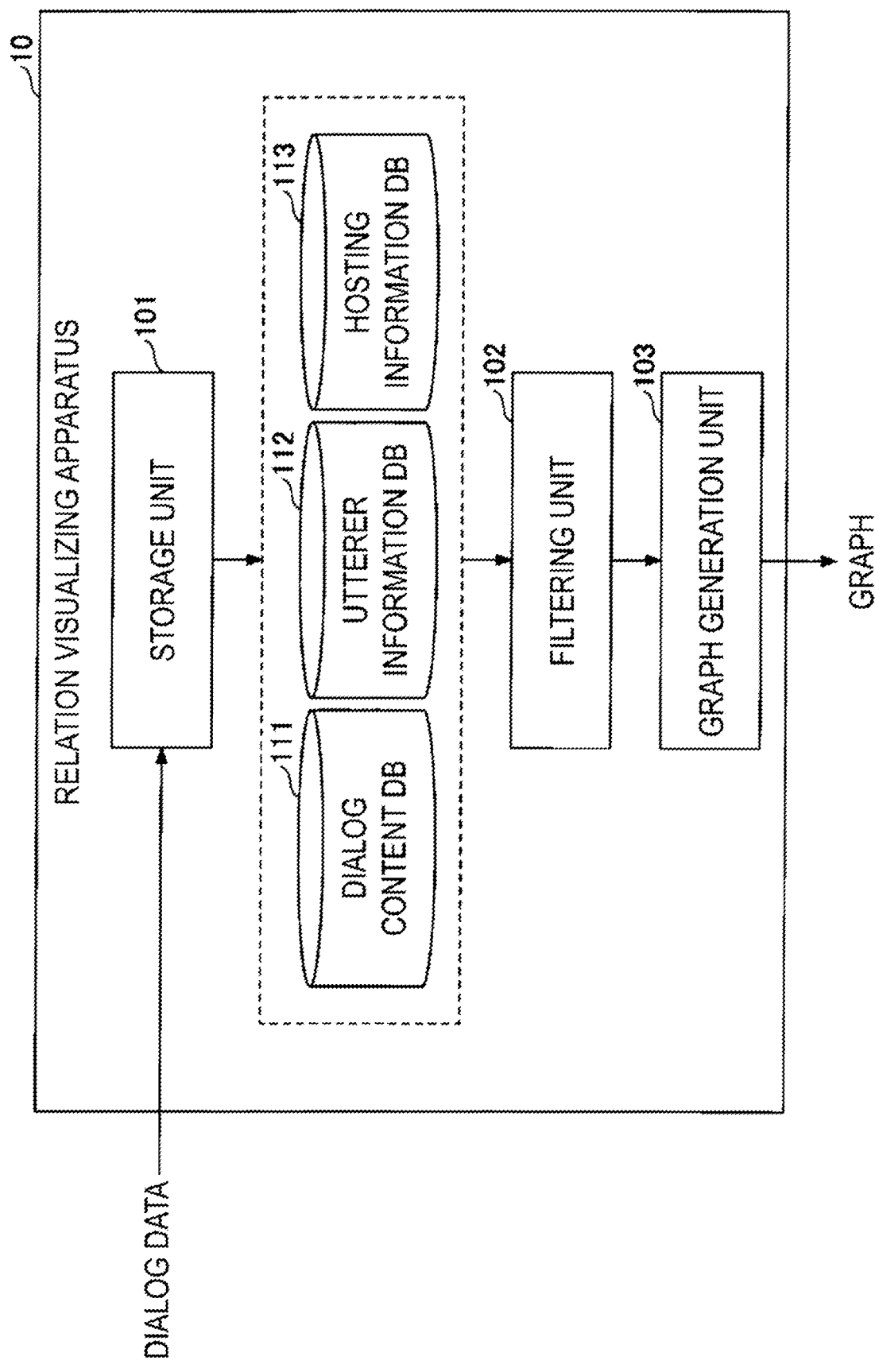
FIG. 1 is a diagram illustrating an example of an overall configuration of a relation visualizing apparatus according to a present embodiment.

First, an overall configuration of the relation visualizing apparatus 10 according to the present embodiment will be described with reference to FIG. 1. FIG. 1 is a diagram illustrating an example of the overall configuration of the relation visualizing apparatus 10 according to the present embodiment.

As illustrated in FIG. 1, the relation visualizing apparatus 10 according to the present embodiment includes a storage unit 101, a filtering unit 102, and a graph generation unit 103. For example, these functional units may be implemented by processing executed by a processor 205, which will be described below, with one or more programs installed in the relation visualizing apparatus 10.

The relation visualizing apparatus 10 according to the present embodiment includes a dialog content DB 111, an utterer information DB 112, and a hosting information DB 113. These DBs can be implemented by using, for example, a memory device 206 which will be described below.

The storage unit 101 inputs dialog data and creates dialog content data necessary for generating a graph representing relation between topics in a dialog to store the dialog content data in the dialog content database (DB) 111. The dialog data is data extracted from a scene in which two or more persons are having a dialog, and examples thereof include video-recorded data recording the dialog, audio-recorded data recording the dialog, and textual data obtained by converting speech included in the video-recorded data or speech included in the audio-recorded data into text with a speech recognition technique. Furthermore, the dialog content data is data necessary for generating a graph and is, for example, data including a topic item, an utterer ID identifying an utterer giving utterance during a dialog, and a hosting ID identifying that the dialog has been hosted. Note that, details of the dialog content data will be described below.

The storage unit 101 creates utterer information data and hosting information data as data used for filtering by the filtering unit 102 and stores the utterer information data and the hosting information data in the utterer information DB 112 and the hosting information DB 113, respectively. The utterer information data is data including information about an utterer (for example, an utterer ID, a sex, and the like) and is associated with the dialog content data by the utterer ID. The hosting information data is data including information regarding hosting of a dialog (for example, a hosting ID, a hosting date, and the like) and is associated with the dialog content data by the hosting ID. Note that details of the utterer information data and the hosting information data will be described below.

Note that in the present embodiment, the storage unit 101 is described as a unit configured to create the dialog content data, the utterer information data, and the hosting information data and store the dialog content data, the utterer information data, and the hosting information data in the dialog content DB 111, the utterer information DB 112, and the hosting information DB 113, respectively, but for example, at least one of the utterer information data and the hosting information data need not be created. That is, the storage unit 101 may create only the dialog content data, create the dialog content data and the utterer information data, create the dialog content data and the hosting information data, or create the dialog content data, the utterer information data, and the hosting information data.

Furthermore, in the present embodiment, the storage unit 101 is described as a unit configured to store the dialog content data, the utterer information data, and the hosting information data in the DBs, but for example, by information contained in each data (dialog content data, utterer information data, and hosting information data) may be written down as a text file to be stored.

The filtering unit 102 filters the dialog content data stored in the dialog content DB 111 using information specified by a user (for example, a sex of an utterer, a hosting date of a dialog, and the like), the utterer information data, and the hosting information data.

The graph generation unit 103 uses the dialog content data filtered by the filtering unit 102 to generate a graph (for example, Sankey diagram, and the like) in which topic items and utterer IDs included in the dialog content data are used as nodes and edges, respectively. This graph is displayed on, for example, a display of the relation visualizing apparatus 10, a display of a terminal connected to the relation visualizing apparatus 10 via a communication network, or the like. This enables to visualize relation between topics (that is, relation between a topic item and an utterer (or the number of utterers) who uttered with respect to the topic item).

Dialog Content Data

The dialog content data stored in the dialog content DB 111 will now be described with reference to FIG. 2. FIG. 2 is a diagram illustrating an example of the dialog content data.

As illustrated in FIG. 2, the dialog content DB 111 has one or more pieces of dialog content data stored therein, and each piece of the dialog content data includes, for example, a "topic item group", a "topic item", an "utterer ID", and a "hosting ID" as data items.

In the data item "topic item group", a name of a topic item group (or an ID of the topic item group) to which a topic item belongs is set, the topic item to which an utterer has given utterance during the dialog. In the data item "topic item", a name of a topic item (or an ID of the topic item) is set, the topic item to which an utterer has given utterance. In the data item "utterer ID", an utterer ID of the utterer (or a name of the utterer, or the like) is set. In the data item "hosting ID", a hosting ID of the dialog is set.

For example, dialog content data of the first row of the example illustrated in FIG. 2 includes a topic item group "ordinary action", a topic item "give origami paper", an utterer ID "P001", and a hosting ID "H002". This represents that in a dialog identified by the hosting ID "H002", an utterer of the utterer ID "P001" has given utterance to the topic item "give origami paper" that belongs to the topic item group "ordinary action".

In this way, each piece of the dialog content data includes at least a topic item to which an utterer has given utterance, a topic item group to which the topic item belongs, and an utterer ID of the utterer. Furthermore, each piece of the dialog content data includes an utterer ID and a hosting ID, and the dialog content data is associated with utterer information data and hosting information data, respectively, by the utterer ID and the hosting ID. Note that the dialog content data illustrated in FIG. 2 is an example, and the dialog content data may include various other pieces of information. Meanwhile, for example, when no hosting information data is created, the dialog content data may include no hosting ID.

Utterer Information Data

The utterer information data stored in the utterer information DB 112 will now be described with reference to FIG. 3. FIG. 3 is a diagram illustrating an example of the utterer information data.

As illustrated in FIG. 3, the utterer information DB 112 includes one or more pieces of utterer information data stored therein, and each piece of the utterer information data includes, for example, a "utterer ID", a "sex", an "age", "marriage", a "child", and a "residential region" as data items.

In the data item "utterer ID", an utterer ID of an utterer (or a name of the utterer, and the like) is set. In the data item "sex", a sex of the utterer is set. In the data item "age", an age of the utterer is set. In the data item "marriage", whether the utterer is married is set. In the data item "child", the number of children of the utterer is set. In the data item "residential region", a region (for example, a prefecture, or the like) where the utterer resides is set.

For example, the utterer information data of the first row of an example illustrated in FIG. 3 includes an utterer ID "P001", a sex "female", an age "30", marriage "Yes", a child "0", and a residential region "Tokyo". This represents that the sex of the utterer of the utterer ID "P001" is female, and she is 30 years old, married, and resides in Tokyo.

In this way, each piece of the utterer information data includes at least an utterer ID of an utterer and attribute information of the utterer (a sex, an age, married or not, the number of children, a residential region, and the like). Note that in the example illustrated in FIG. 3, the sex, age, married or not, number of children, and residential region of the utterer are used as the attribute information, but this is an example, and any information related to the attributes of the utterer (for example, an occupation, height, weight, smoking or not, and the like) may be used as the attribute information. In particular, any information can be used as the attribute information depending on a dialog subject.

Relation Information Data

The hosting information data stored in the hosting information DB 113 will now be described with reference to FIG. 4. FIG. 4 is diagram illustrating an example of the hosting information data.

As illustrated in FIG. 4, the hosting information DB 113 stores one or more pieces of the hosting information data, and each piece of the hosting information data includes, for example, a "hosting ID", a "hosting date", a "number of times of hosting", and a "hosting place" as data items.

In the data item "hosting ID", a hosting ID of a dialog is set. In the data item "hosting date", the latest date when the dialog has been hosted is set. In the data item "number of times of hosting", the number of times that the dialog has been hosted is set. As the data item "hosting place", a place at which the dialog has been hosted is set.

For example, the hosting information data of the first row of the example illustrated in FIG. 4 includes a hosting ID "H001", a hosting date "2019/10/21", the number of times of hosting "2", and a hosting place "Yokosuka". This represents that a dialog of the hosting ID "H001" has been hosted twice and was hosted in Yokosuka on Oct. 21, 2019, most recently.

In this way, each piece of the hosting information data includes a hosting ID of a dialog, and a date on which the dialog was hosted, a place where the dialog was hosted, and the number of times the dialog was hosted, and the like. Note that in the example illustrated in FIG. 4, the latest hosting date and the hosting place are included as the hosting date and the hosting place in the hosting information data, but for example, the history of hosting dates and the history of hosting places may be included for a dialog of an identical hosting ID.

Relation Visualizing Processing

Figure 5:
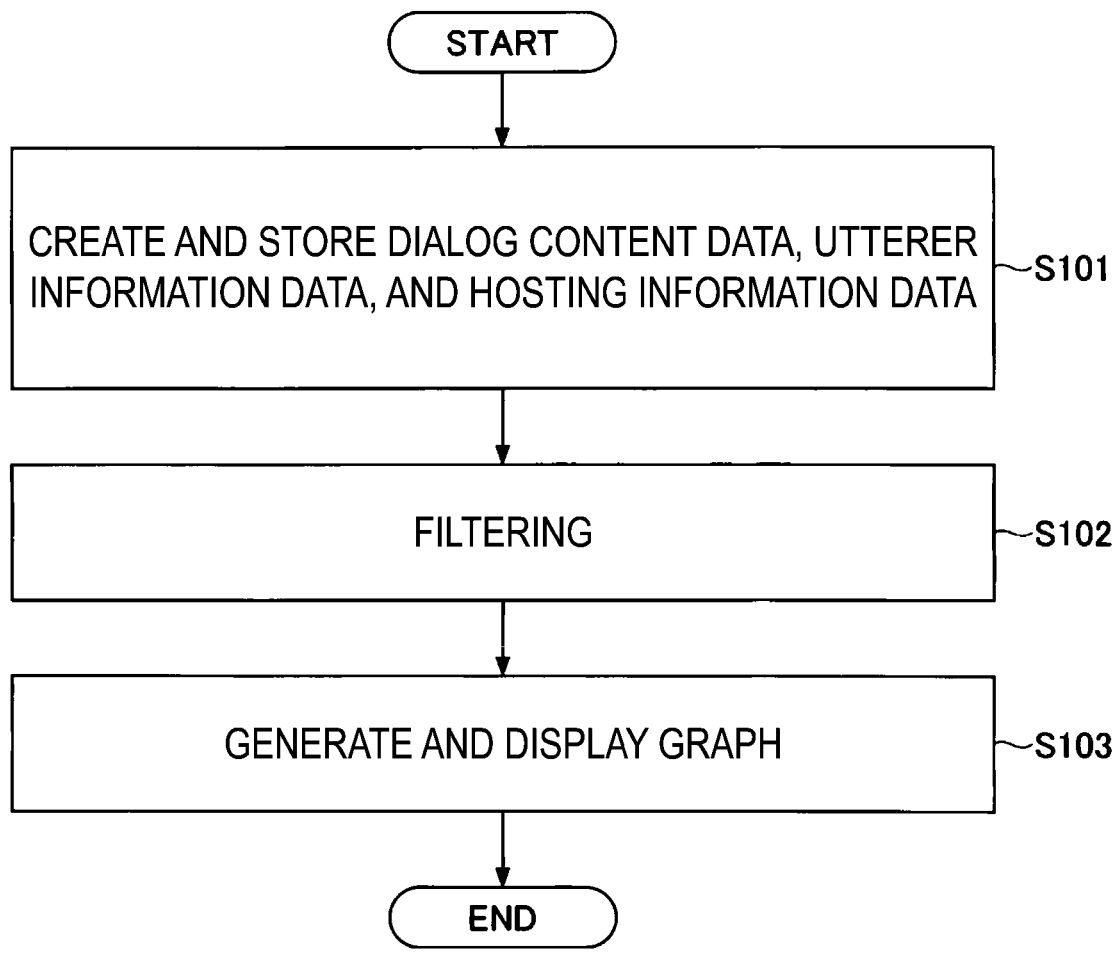
FIG. 5 is a flowchart illustrating an example of relation visualizing processing according to the present embodiment.

Next, relation visualizing processing in which relation between topic items during a dialog is visualized using a graph will be described with reference to FIG. 5. FIG. 5 is a flowchart illustrating an example of relation visualizing processing according to the present embodiment.

Step S101: First, the storage unit 101 inputs dialog data to create dialog content data, utterer information data, and hosting information data to be stored in the dialog content DB 111, the utterer information DB 112, and the hosting information DB 113, respectively. Note that as described above, the storage unit 101 only need create and store at least the dialog content data and need not create at least one of the utterer information data and the hosting information data.

Here, the storage unit 101 may acquire or extract various pieces of information (for example, a topic item group, a topic item, an utterer ID, and the like) from the dialog data by using a known technique to create the dialog content data, the utterer information data, and the hosting information data.

Examples of the method for acquiring a topic item group, a topic item, and an utterer ID include the following methods.

For example, when the dialog data is video-recorded data, "which utterer has selected which topic item to give utterance" may be manually extracted from the video-recorded data and a topic item representing a reason why the topic item has been selected may be manually written down to acquire the topic item, a topic item group to which the topic item belongs, and an utterer ID. More specifically, for example, a topic item, a topic item group, and an utterer ID may be acquired by playing back video-recorded data and manually identifying an utterance start time and an utterance end time for a topic and an utterer that has given utterance to the topic.

For example, when an utterer ID is associated with dialog data, a technique disclosed in JP 2019-117457 A may be used to estimate a comprehensive topic and a local topic from the dialog data and acquire the estimated comprehensive topic and local topic as a topic item group and a topic item of the utterer ID, respectively.

For example, when an utterer ID, a topic item group, and a topic item are associated with each piece of utterance in dialog data, the utterer ID, the topic item group, and the topic item may be acquired. To create such dialog data, for example, a method is conceivable in which when an utterer gives utterance during a dialog, the utterer is made to input the utterer ID of himself/herself, a topic item to which he/she gives utterance, a topic item representing the reason why the topic item has been selected, and the like, to a terminal (a personal computer (PC), a tablet terminal, or the like).

For example, topic items may be described in advance on construction paper or the like, and when an utterer give utterance during a dialog, the utterer may be made to select a topic item with a different color pen, so that an utterer ID, a topic item group, and a topic item may be acquired based on color information corresponding to the utterer.

Meanwhile, it is conceivable to acquire or identify a hosting ID, a hosting date, a hosting place, and the like from, for example, bibliographic information provided to the dialog data (for example, a file name provided to the dialog data, preparation date information, location information, and the like). It is conceivable to determine the number of times of hosting by whether or not there exists hosting information data having the same hosting ID in the hosting information data stored in the hosting information DB 112.

Further, attribute information of an utterer (for example, a sex, an age, married or not, the number of children, a residential region, and the like) may be associated with dialog data for each utterer, for example. In this case, for example, a method is conceivable in which prior to or after a dialog, an utterer is made to input attribute information of the utterer to a terminal by himself/herself.

Note that, for example, the utterer information data may be stored in the utterer information DB 112 in advance, rather than being created by the storage unit 101. Alternatively, the storage unit 101 may create only utterer information data that is not stored in the utterer information DB 112, for example.

Step S102: The filtering unit 102 filters the dialog content data stored in the dialog content DB 111 using information specified by a user (hereinafter, referred to as "user-specified information") and the utterer information data, and the hosting information data. At this time, the filtering unit 102 uses the user-specified information and filters the dialog content data stored in the dialog content DB 111, the utterer information data stored in the utterer information DB 112, and the hosting information data stored in the hosting information DB 113 in a predetermined preferential order to filter the dialog content data stored in the dialog content DB 111.

Hereinafter, as an example, a case will be described in which the hosting information data stored in the hosting information DB 113, the utterer information data stored in the utterer information DB 112, and the dialog content data stored in the dialog content DB 111 are filtered in this order.

Filtering of the hosting information data stored in the hosting information DB 113 In filtering the hosting information data, filtering is performed using, for example, a hosting date, the number of times of hosting, a hosting place, and the like as the user-specified information. Note that the number of pieces of information used for filtering as the user-specified information may be one or multiple. When a user uses a plurality of pieces of information for filtering, the user can specify whether to perform filtering with the logical sum of these pieces of information or to perform filtering with the logical product of these pieces of information.

At this time, the filtering unit 102 filters a piece of the hosting information data, which does not satisfy the user-specified information, among the hosting information data stored in the hosting information DB 113. For example, when "hosting date=2019/10/21 $\wedge$ number of times of hosting=2" is specified as the user-specified information, pieces of the hosting information data other than pieces of the hosting information data having the hosting date of "2019/10/21" and the number of times of hosting of "2" are filtered. Similarly, for example, when "hosting date=2019/10/21 $\vee$ hosting place=Yokosuka" is specified as the user-specified information, pieces of the hosting information data other than pieces of the hosting information data having the hosting date of "2019/10/21" or the hosting place of "Yokosuka" are filtered.

The filtering unit 102 then filters pieces of the dialog content data other than pieces of the dialog content data corresponding to the pieces of the hosting information data that have not been filtered (that is, pieces of the dialog content data including the same hosting ID as the hosting ID of the pieces of the hosting information data that have not been filtered) among the dialog content data stored in the dialog content DB 111.

Hereinafter, among the hosting information data stored in the hosting information DB 113, the dialog content data corresponding to the hosting information data that has not been filtered is referred to as "first filtered dialog content data". Note that, when filtering of the hosting information data is not performed, dialog content data corresponding to all the hosting information data stored in the hosting information DB 113 may be used as the first filtered dialog content data.

Note that, after a graph is generated by the graph generation unit 103 in step S103 described below as well, the hosting information data is dynamically filtered by the filtering unit 102 in accordance with change or the like of the user-specified information, and the first filtered dialog content data is also dynamically changed. Such change or the like of the user-specified information can be performed by using, for example, a pull-down menu, a check box, an input form, or the like.

Filtering of the utterer information data stored in the utterer information DB 112 In filtering of the utterer information data, filtering is performed using, for example, a sex, an age, married or not, the number of children, a residential region, and the like (that is, attribute information) as the user-specified information. Note that the number of pieces of information used for filtering as the user-specified information may be one or multiple. When a user uses a plurality of pieces of information for filtering, the user can specify whether to perform filtering with the logical sum of these pieces of information or to perform filtering with the logical product of these pieces of information. Further, when there is utterer information data in which attribute information is not registered (for example, utterer information data in which the attribute information is blank or a null value), it may be specified whether or not such utterer information data is to be filtered.

At this time, the filtering unit 102 filters a piece of the utterer information data, which does not satisfy the user-specified information, among the utterer information data corresponding to the first filtered dialog content data (that is, utterer information data including the same utterer ID as the utterer ID of the first filtered dialog content data). For example, when "sex=female $\wedge$ marriage=yes" is specified as the user-specified information, pieces of the utterer information data other than pieces of the utterer information data having the sex of "female" and the marriage "yes" are filtered, among pieces of the utterer information data corresponding to the first filtered dialog content data. Similarly, for example, when "sex=male $\vee$ child=1" is specified as the user-specified information, pieces of the utterer information data other than pieces of the utterer information data having the sex of "male" or the child of "1" are filtered, among pieces of the utterer information data corresponding to the first filtered dialog content data.

Then, the filtering unit 102 filters pieces of the dialog content data other than pieces of the dialog content data corresponding to pieces of the utterer information data that have not been filtered (that is, pieces of the dialog content data including the same utterer ID as the utterer ID of pieces of the utterer information data that have not been filtered) among the first filtered dialog content data.

Hereinafter, the dialog content data corresponding to the utterer information data that has not been filtered among the first filtered dialog content data is referred to as "second filtered dialog content data". Note that, when filtering of the utterer information data is not performed, the first filtered dialog content data may be used as the second filtered dialog content data as is.

Note that, after a graph is generated by the graph generation unit 103 in step S103 described below as well, the utterer information data is dynamically filtered by the filtering unit 102 in accordance with change or the like of the user-specified information, and the second filtered dialog content data is also dynamically changed.

Filtering of the dialog content data stored in the dialog content DB 111 In filtering of the dialog content data, filtering is performed using, for example, a topic item group, a topic item, and the like as the user-specified information. Note that the number of pieces of information used for filtering as the user-specified information may be one or multiple. When a user uses a plurality of pieces of information for filtering, the user can specify whether to perform filtering with the logical sum of these pieces of information or to perform filtering with the logical product of these pieces of information.

At this time, the filtering unit 102 filters utterance content data that does not satisfy the user-specified information among the second filtered dialog content data. For example, when the user-specified information is "topic item group=ordinary action $\vee$ topic item group=purpose of ordinary action $\vee$ topic item group=future goal", pieces of the dialog content data other than pieces of the dialog content data having the topic item group of "ordinary action", "purpose of ordinary action", or "future goal" are filtered among the second filtered dialog content data.

Hereinafter, the dialog content data that has not been filtered among the second filtered dialog content data is referred to as "dialog content data for visualization". In step S103 described below, a graph is generated from the dialog content data for visualization, and relation between topic items included in the dialog content data for visualization is visualized. Note that, in a case where filtering of the dialog content data is not performed, the second filtered dialog content data may be used as the dialog content data for visualization as is.

Note that, after a graph is generated by the graph generation unit 103 in step S103 described below as well, the second filtered dialog content data is dynamically filtered by the filtering unit 102 in accordance with change or like of the user-specified information, and the dialog content data for visualization is dynamically changed.

Here, in the present embodiment, the case has been described in which filtering is performed in the order of the hosting information data stored in the hosting information DB 113, the utterer information data stored in the utterer information DB 112, and the dialog content data stored in the dialog content DB 111; however this is an example, and it is possible to perform filtering in any order set in advance.

Step S103: The graph generation unit 103 uses the dialog content data for visualization obtained in step S102 described above to generate a graph having topic items included in the dialog content data for visualization as nodes and utterer IDs corresponding to different topic items among the utterer IDs as edges. That is, the graph generation unit 103 uses the topic items and the utterer IDs included in the dialog content data for visualization to use the topic items as the nodes and use, when different two topic items are associated with an identical utterer ID, the utterer ID as the edge between two nodes representing the two topic items. In this way, a graph composed of the nodes and the edges is generated. Note that in this case, the number of edges between two nodes is the number of utterer IDs of different utterers that have given utterance to the two topic items represented by the two nodes.

The graph generated in step S103 described above is displayed on, for example, a display of the relation visualizing apparatus 10, a display of a terminal connected to the relation visualizing apparatus 10 via a communication network, or the like. In this way, a plurality of topic items in a dialog and utterer IDs of utterers that have given utterance to certain two topic items among these topic items are visualized using a graph.

Here, in the present embodiment, as an example, a case in which the graph generation unit 103 generates a Sankey diagram as the graph will be described. When the Sankey diagram is generated, the graph generation unit 103 uses the topic item group included in the dialog content data for visualization for a hierarchy (step) of the Sankey diagram. Note that the Sankey diagram is a diagram or graph representing a flow rate and the like between a plurality of hierarchies (steps). In the Sankey diagram, it is possible to simultaneously represent the flow rate and a state of transition between steps.

Figure 6:
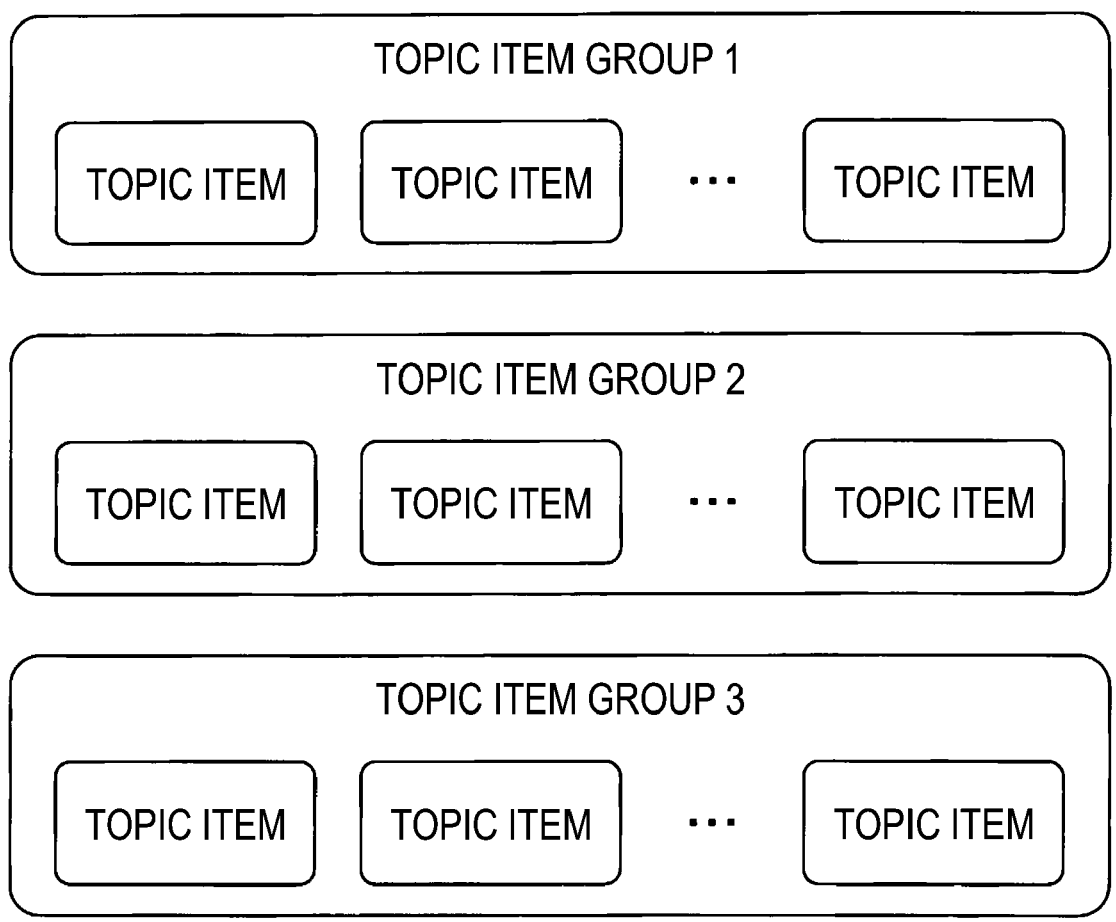
FIG. 6 is a diagram illustrating an example of arrangement of topic item groups (part 1).
Figure 7:
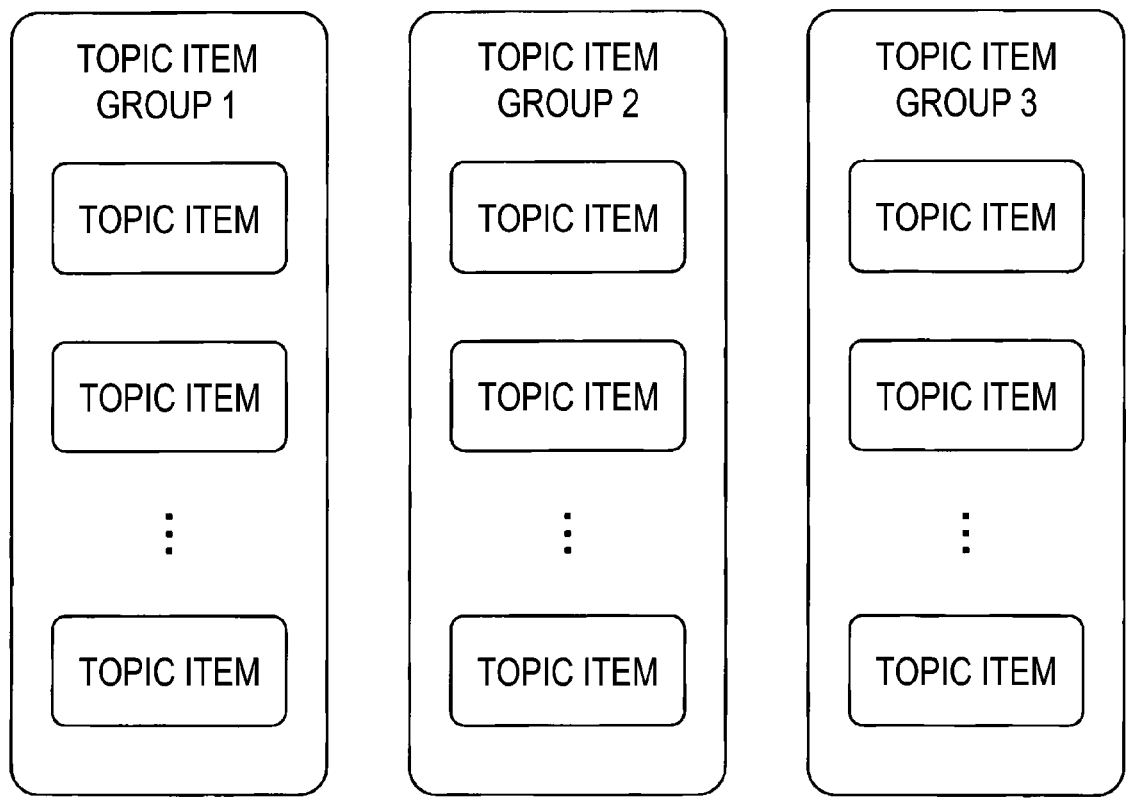
FIG. 7 is a diagram illustrating an example of arrangement of topic item groups (part 2).

When the Sankey diagram is generated, first, the graph generation unit 103 arranges topic item groups (hierarchies) to which topic items (nodes) belong vertically or horizontally. For example, when the topic item groups included in the dialog content data for visualization obtained in step S102 described above are "topic item group 1", "topic item group 2", and "topic item group 3", the graph generation unit 103 may arrange the topic item group 1 to the topic item group 3 vertically as illustrated in FIG. 6. Alternatively, in such a case, the graph generation unit 103 may arrange the topic item group 1 to the topic item group 3 horizontally as illustrated in FIG. 7.

Next, when two topic items (nodes) belonging to different topic item groups are associated with an identical utterer ID, the graph generation unit 103 sets the utterer ID as an edge between two nodes representing the two topic items. In this way, a graph (Sankey diagram) composed of hierarchized nodes and edges is generated.

Note that arrangement positions of topic item groups (for example, when topic item groups are arranged horizontally, the order in which each topic item group is arranged from the left, when topic item groups are arranged vertically, the order in which each topic item group is arranged from the top, or the like) may be arbitrarily specified or set, or may be determined in accordance with a predetermined group arrangement rule. As the group arrangement rule, for example, it is conceivable to count all the number of edges between nodes and determine arrangement positions of topic item groups in such a manner that the number of edges between nodes belonging to topic item groups adjacent to each other is maximized (in other words, the number of edges between nodes belonging to topic item groups not adjacent to each other is minimized).

In addition, arrangement positions of topic items (nodes) belonging to a topic item group may be arbitrarily specified or set within the topic item group, or may be determined in accordance with a predetermined node arrangement rule. As the node arrangement rule, for example, it is conceivable to determine arrangement positions of nodes in such a manner that lengths of all edges become shortest.

Figure 8:
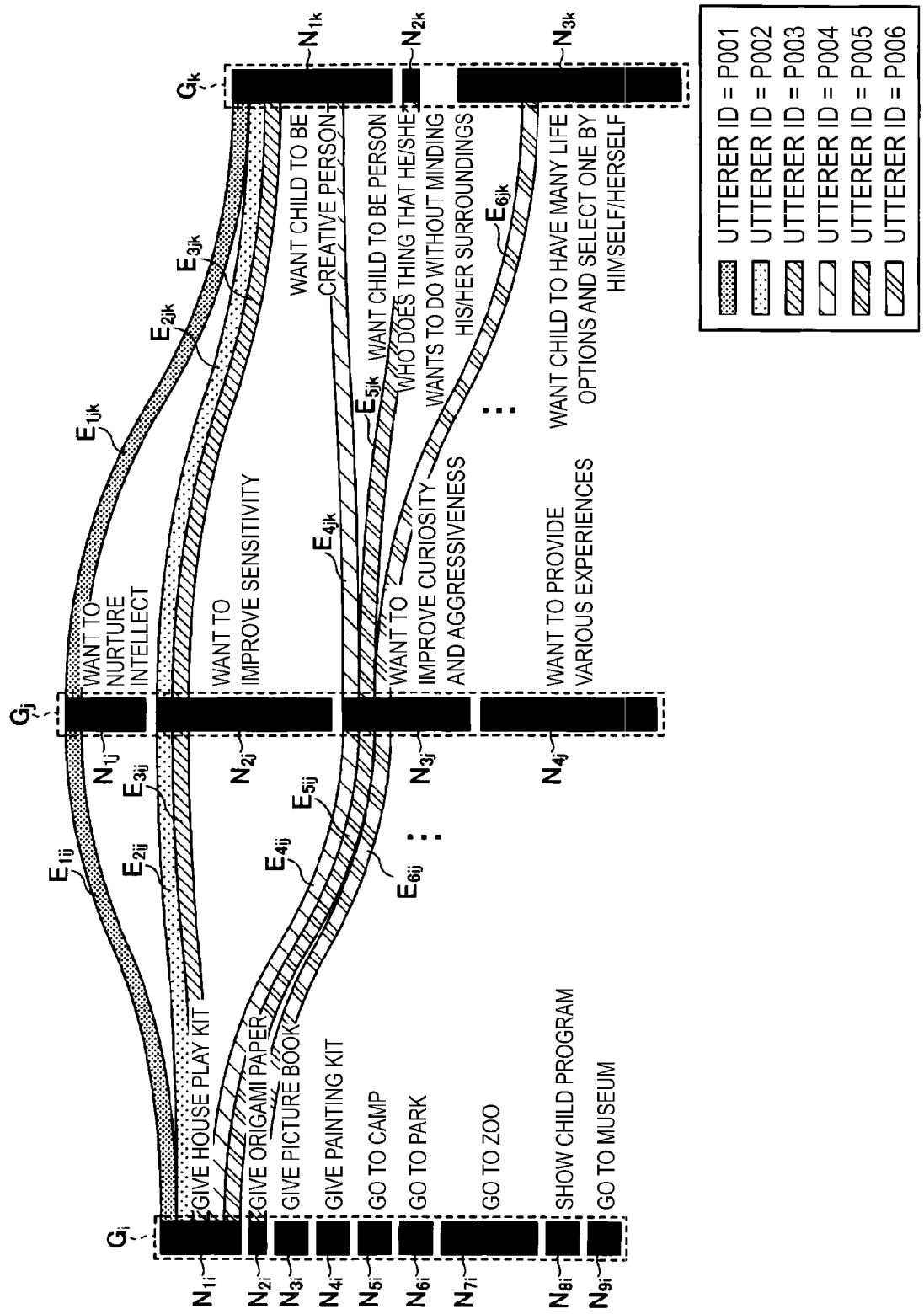
FIG. 8 is a diagram illustrating an example of a Sankey diagram.

Here, FIG. 8 illustrates an example of the Sankey diagram in a case where when a topic item group "ordinary action" is $G_i$, a topic item group "purpose of action" is $G_j$, and a topic item group "future goal" is $G_k$, these topic item groups $G_i$, $G_j$, and $G_k$ are arranged horizontally in the order from the left. FIG. 8 is a diagram illustrating the example of the Sankey diagram. In the example illustrated in FIG. 8, topic items included in the topic item group $G_i$ are represented by $N_{1i}$ to $N_{9i}$, topic items included in the topic item group $G_j$ are represented by $N_{1j}$ to $N_{4j}$, and topic items included in the topic item group $G_k$ are represented by $N_{1k}$ to $N_{3k}$. For example, the topic item $N_{1i}$ is a topic item "give house play kit", which is one node in the Sankey diagram. Similarly, the topic item $N_{2i}$ is a topic item "give origami paper", which is one node in the Sankey diagram. In other topic items, similarly, a word described beside each topic item represents the content of the topic item and serves as a node of the Sankey diagram.

In the example illustrated in FIG. 8, the topic item (node) $N_{1k}$ and the topic item (node) $N_{1j}$ are connected by an edge $E_{1ij}$. This represents that an utterer of the utterer ID "P001" has given utterance to the topic item $N_{1k}$ and the topic item $N_{1j}$. Similarly, the topic item (node) $N_{1k}$ and the topic item (node) $N_{2j}$ are connected by an edge $E_{2ij}$. This represents that the utterer of the utterer ID "P001" has given utterance to the topic item $N_{1k}$ and the topic item $N_{1j}$. For other edges $E_{3ij}$ to $E_{6ij}$ and $E_{1ij}k$ to $E_{6jk}$, similarly, when topic items belonging to different topic item groups are connected by an edge, it is represented that an utterer of an utterer ID corresponding to this edge has given utterance to two topic items connected by this edge.

Note that, in the example illustrated in FIG. 8, edges connecting the topic items included in the topic item group $G_i$ and the topic items included in the topic item group $G_k$ are hidden (that is, edges between topic items belonging to topic item groups not adjacent to each other are hidden).

Here, for each utterer ID, an edge corresponding to the utterer ID may be displayed in a different mode (for example, displayed in a different color), or all edges may be displayed in the same mode. When an edge is displayed in a different mode for each utterer ID, a user can easily grasp a relationship between each topic item and the utterer ID. On the other hand, when all edges in the Sankey diagram are displayed in the same mode, a larger number of utterers that have given utterance to certain two topic items makes an edge between the two topic items displayed more boldly, and thus the user can easily grasp the number of utterers that have given utterance to the two topic items.

For example, a user may be able to move a node freely with drag and drop using an input device such as a mouse. Furthermore, by mousing over or clicking on a node, an edge connected to the node may be emphatically displayed (for example, highlighted). Similarly, by mousing over or clicking on an edge, an edge of the same utterer ID as that of this edge may be emphatically displayed.

Furthermore, the graph generation unit 103 may use utterer information data and hosting information data corresponding to the dialog content data for visualization obtained in step S102 described above, to display attribute information of the utterer, the hosting date, the number of times of hosting, and the hosting place of the dialog on the graph. For example, when a user mouses over an edge, attribute information of an utterer of the utterer ID corresponding to the edge may be displayed.

Note that, in the present embodiment, topic items belonging to the same topic item group are not connected by an edge, but these topic items may be connected by an edge. In addition, an edge connecting topic items belonging to the same topic item group may be able to be switched between displayed/hidden by user selection or the like. Similarly, an edge between topic items belonging to topic item groups not adjacent to each other may be able to be switched between displayed/hidden by user selection or the like.

First Modified Example

Next, a first modified example of the present embodiment will be described. As the first modified example, when a graph is generated in step S103 in FIG. 5, the graph generation unit 103 may cluster the dialog content data for visualization by meanings of topic items to generate a graph for each cluster.

More specifically, the graph generation unit 103 converts topic items included in each piece of the dialog content data for visualization into vectors by, for example, Doc2vec or the like, and clusters these vectors. Then, for each cluster, the graph generation unit 103 uses a piece of the dialog content data for visualization corresponding to a vector belonging to the cluster to generate a graph as in step S103 in FIG. 5. In this way, for each cluster, a graph in which the relation between the topic items belonging to the cluster is visualized is obtained. Noted that as the clustering technique, any clustering technique such as hierarchical cluster analysis, a k-means method, or a support vector machine can be employed. For Doc2vec, for example, see Reference "Q. Le, T. Mikolov. 2014. Distributed Representations of Sentences and Documents. In Proceedings of ICML 2014." and the like.

Note that although vectors obtained by converting topic items included in each piece of the dialog content data for visualization with Doc2vec or the like have been clustered, for example, these vectors may be clustered after being dimensionally reduced in two dimensions using principal component analysis or the like.

Second Modified Example

Next, a second modified example of the present embodiment will be described. As the second modified example, a case in which regional information related to a topic item is also added to a graph as a node will be described.

Overall Configuration

Figure 9:
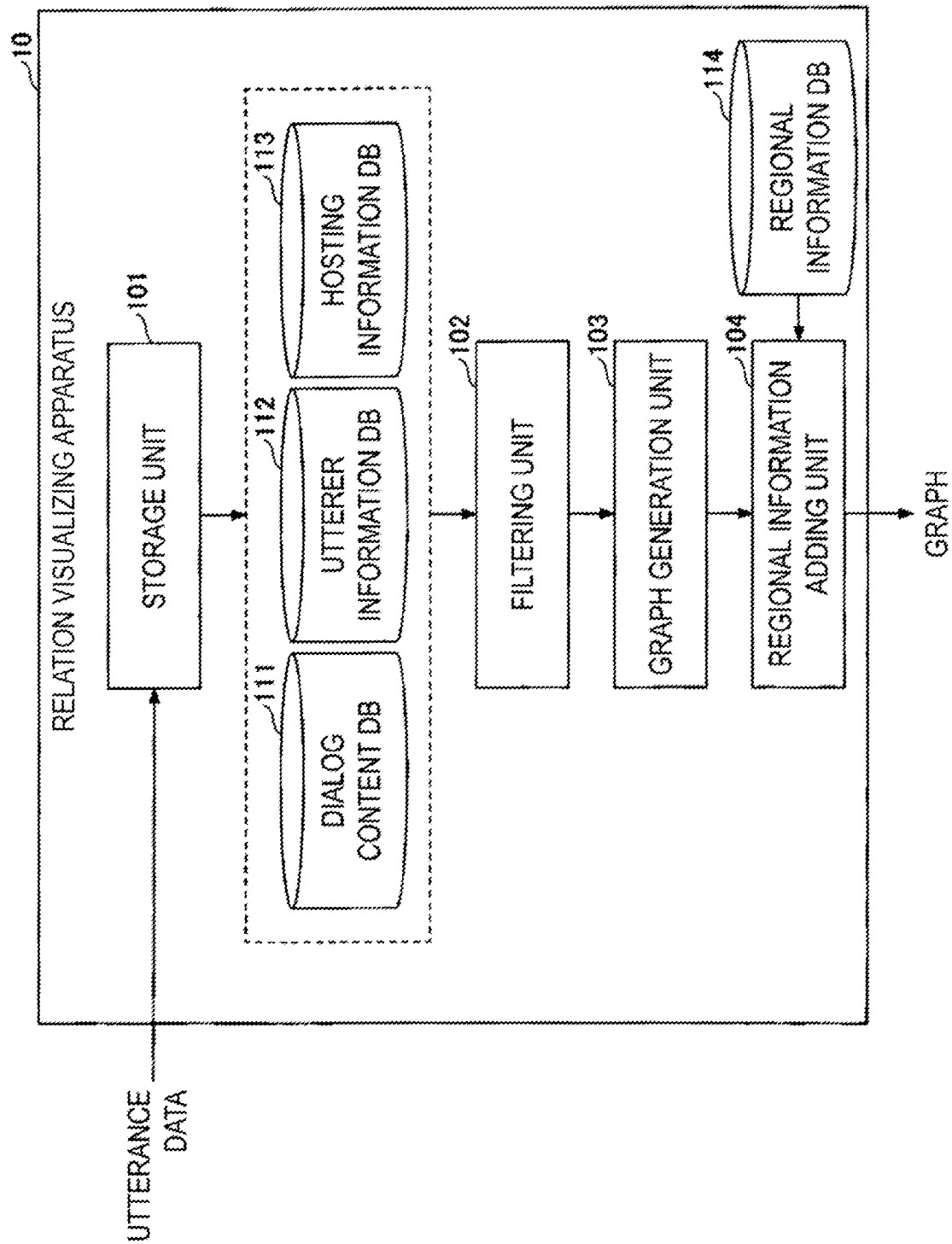
FIG. 9 is a diagram illustrating an example of an overall configuration of a relation visualizing apparatus according to a second modified example of the present embodiment.

First, an overall configuration of the relation visualizing apparatus 10 according to the second modified example of the present embodiment will be described with reference to FIG. 9. FIG. 9 is a diagram illustrating an example of the overall configuration of the relation visualizing apparatus 10 according to the second modified example of the present embodiment.

As illustrated in FIG. 9, the relation visualizing apparatus 10 according to the second modified example of the present embodiment further includes a regional information adding unit 104 and a regional information DB 114. For example, the regional information adding unit 104 may be implemented by processing executed by the processor 205 with one or more programs installed in the relation visualizing apparatus 10. Further, the regional information DB 114 can be implemented by using, for example, the memory device 206 described below.

The regional information adding unit 104 uses the regional information data stored in the regional information DB 114 to add, to a graph generated by the graph generation unit 103, regional information associated with nodes (topic items) included in the graph as nodes, and connects these nodes by edges. As a result, when a topic item is associated with some regional information, relation between the topic item and the regional information can be visualized. Note that the regional information is information on a geographic place, the place itself or any facility present at the place, and the like.

The regional information DB 114 stores regional information data. Here, the regional information data stored in the regional information DB 114 will be described with reference to FIG. 10. FIG. 10 is a diagram illustrating an example of the regional information DB.

As illustrated in FIG. 10, one or more pieces of regional information data are stored in the regional information DB 114. These pieces of regional information data are data representing regional information, and each piece of regional information data includes, for example, a "category", a "name", and a "place" as data items.

In the data item "category", a category to which regional information belongs is set. In the data item "name", a name of the regional information (or an ID of the regional information) is set. In the data item "place", a place of the regional information (for example, a name of a municipality, latitude and longitude information, and the like) is set.

For example, the regional information data of the first row of the example illustrated in FIG. 10 includes a category "park", a name "○○ park", and a place "○○-city, Tokyo". This represents that "○○ park" in "○○-city, Tokyo" belongs to the category "Park".

As such, each piece of the regional information data includes a category of regional information, a name, and a place. Note that, the regional information data illustrated in FIG. 10 is an example, and various pieces of information other than these may be included in the regional information data.

Relation Visualizing Processing

Figure 11:
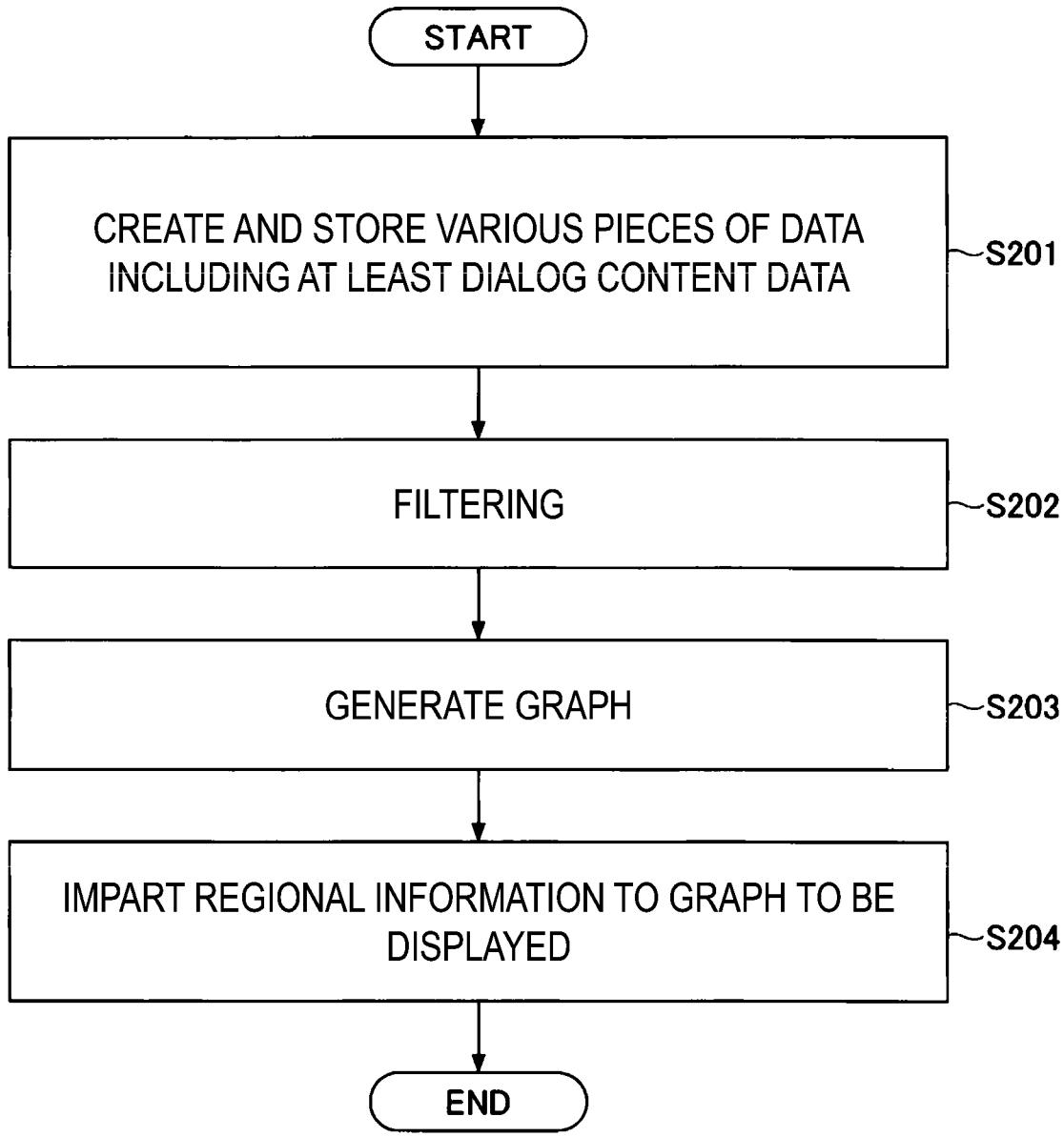
FIG. 11 is a flowchart illustrating an example of relation visualizing processing according to the second modified example of the present embodiment.

Next, relation visualizing processing according to the second modified example will be described with reference to FIG. 11. FIG. 11 is a flowchart illustrating an example of the relation visualizing processing according to the second modified example of the present embodiment. Note that the step S201 to step S202 are the same as the step S101 to step S102 in FIG. 5, and thus the description thereof will be omitted.

Step S203: The graph generation unit 103 uses the dialog content data for visualization obtained in step S202 to generate a graph, as in step S103 in FIG. 5.

Step S204: The regional information adding unit 104 then uses the regional information data stored in the regional information DB 114 to add, to the graph generated in step S203 described above, regional information associated with nodes (topic items) included in the graph as nodes, and connects these nodes by edges.

For example, the regional information adding unit 104 morphologically analyzes the nodes (topic items) included in the graph generated in step S203 described above (more properly, morphologically analyzes sentences representing the topic items) to extract a noun from the topic items. Next, the regional information adding unit 104 identifies regional information data including the extracted noun as a category among the regional information data stored in the regional information DB 114. Then, the regional information adding unit 104 adds the regional information represented by the identified regional information data as a node to the graph, and connects the topic item (node) and the regional information (node) by an edge.

Figure 12:
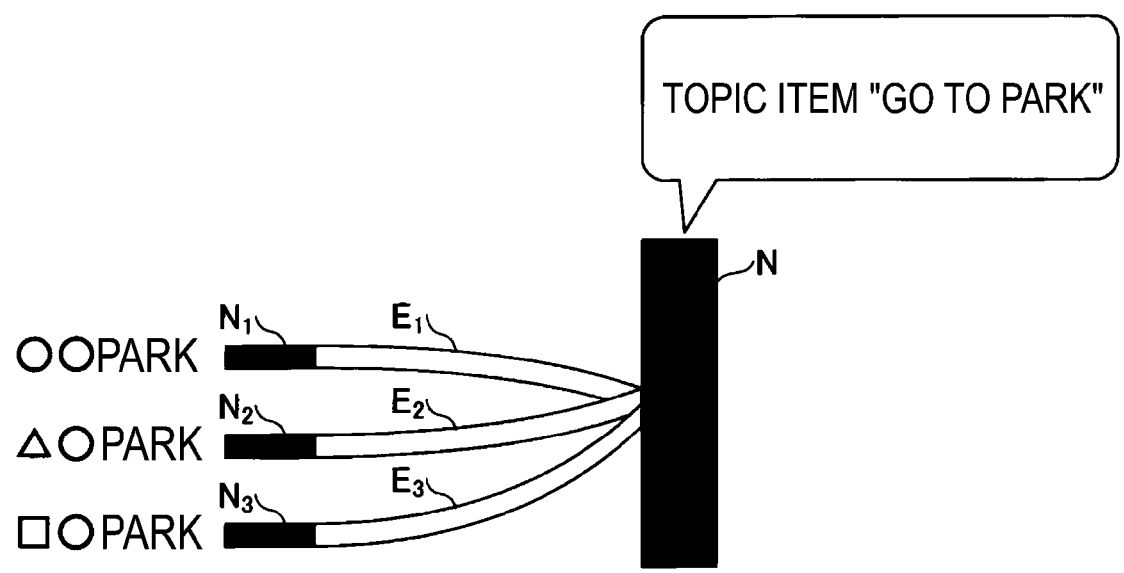
FIG. 12 is a diagram illustrating an example of a case where regional information is added as a node.

More specifically, for example, when a node (topic item) included in the graph generated in step S203 described above is "go to park", the regional information adding unit 104 morphologically analyzes the topic item to extract a noun. In this case, the topic item "go to park" is morphologically analyzed as "go", "to", and "park" and thus a noun "park" is extracted. Next, the regional information adding unit 104 identifies a piece of the regional information data in which "park" is set in the category, among the regional information data stored in the regional information DB 114. Then, the regional information adding unit 104 adds regional information represented by the piece of the regional information data that has been identified (hereinafter, referred to as "identified regional information data") as a node to the graph, and connects the node of the topic item "go to park" and the regional information (node) by an edge. As a result, for example, as illustrated in FIG. 12, when the node of the topic item "go to park" is N, and nodes of the regional information represented by the piece of the regional information data in which the "park" is set in the category are $N_1$ to $N_3$, the node N and each of the nodes $N_1$ to $N_3$ are connected by edges $E_1$ to $E_3$.

Note that, for example, when a plurality of nouns are extracted as a result of morphological analysis of the topic items, the regional information adding unit 104 only need select a noun that is set most in the category of the regional information data stored in the regional information DB 114, among the plurality of nouns.

The graph in which regional information has been added as a node in step S204 described above is displayed on, for example, a display of the relation visualizing apparatus 10 or a display of a terminal connected to the relation visualizing apparatus 10 via a communication network, or the like. In this way, a plurality of topic items in a dialog, an utterer ID of an utterer that has given utterance to certain two topic items of these topic items, and regional information related to the topic items are visualized using a graph. Thus, for example, even if regional information such as locational information or geographic information is insufficient for a topic item to which an utterer has given utterance, a user can grasp relation between the topic item and the regional information.

Note that although, in the above description, regional information represented by all the identified regional information data has been added to the graph as nodes, for example, regional information represented by filtered identified regional information data obtained by filtering the identified regional information data with some conditions may be added to the graph as nodes. For example, pieces of the identified regional information data other than pieces of the identified regional information data in which a place near a residential region of an utterer that has given utterance to the topic item "go to park" is set may be filtered to add regional information represented by the filtered identified regional information data to the graph as nodes. Alternatively, for example, pieces of the identified regional information data other than pieces of the identified regional information data in which a place near the hosting place of the dialog is set may be filtered to add regional information represented by the filtered identified regional information data to the graph as nodes.

Furthermore, the regional information (nodes) and edges added to the graph generated in step S203 may be able to be switched between displayed/hidden by user selection or the like, for example.

Hardware Configuration

Figure 13:
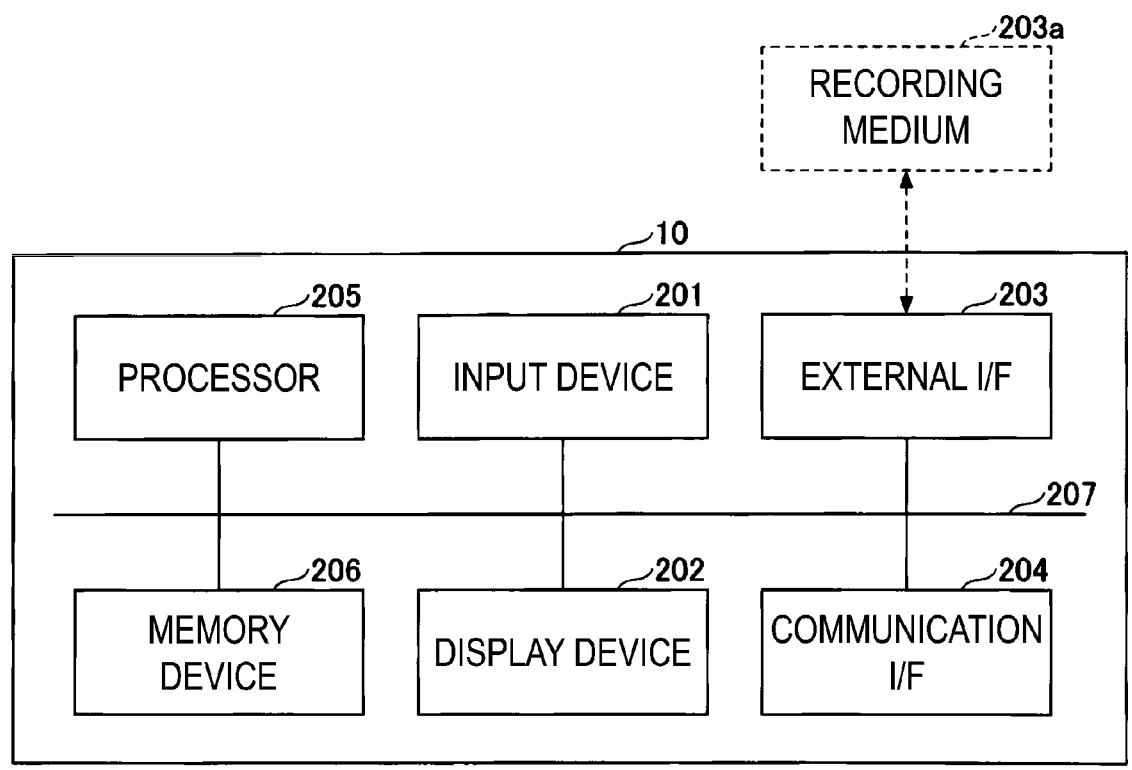
FIG. 13 is a diagram illustrating an example of a hardware configuration of the relation visualizing apparatus according to the present embodiment.

Finally, a hardware configuration of the relation visualizing apparatus 10 according to the present embodiment will be described with reference to FIG. 13. FIG. 13 is a diagram illustrating an example of the hardware configuration of the relation visualizing apparatus 10 according to the present embodiment.

As illustrated in FIG. 13, the relation visualizing apparatus 10 according to the present embodiment is implemented by a general-purpose computer or a computer system, and includes an input device 201, a display device 202, an external I/F 203, a communication I/F 204, a processor 205, and a memory device 206. The pieces of hardware are communicatively connected via a bus 207.

The input device 201 is, for example, a keyboard, a mouse, or a touch panel. The display device 202 is, for example, a display. Note that the relation visualizing apparatus 10 need not include the input device 201.

The external I/F 203 is an interface with an external device. The external device includes a recording medium 203a or the like. The relation visualizing apparatus 10 can read from or write to the recording medium 203a via the external I/F 203. One or more programs for implementing the functional units (the storage unit 101, the filtering unit 102, and the graph generation unit 103) included in the relation visualizing apparatus 10 may be stored in the recording medium 203a.

Examples of the recording medium 203a include a compact disc (CD), a digital versatile disk (DVD), a secure digital memory card (SD memory card), and a universal serial bus (USB) memory card.

The communication I/F 204 is an interface for connecting the relation visualizing apparatus 10 to a communication network. One or more programs that implement each functional unit of the relation visualizing apparatus 10 may be acquired (downloaded) from a predetermined server device or the like via the communication I/F 204.

The processor 205 is, for example, any of various arithmetic operation devices such as a central processing unit (CPU). The memory device 206 is, for example, any storage device such as a hard disk drive (HDD), a solid state drive (SSD), a random access memory (RAM), a read only memory (ROM), or a flash memory.

The relation visualizing apparatus 10 according to the present embodiment has the hardware configuration illustrated in FIG. 13 and thus can implement the relation visualizing processing described above. Note that the hardware configuration illustrated in FIG. 13 is an example, and the relation visualizing apparatus 10 may have another hardware configuration. For example, the relation visualizing apparatus 10 may have a plurality of processors 205 or may have a plurality of memory devices 206.

The present invention is not limited to the above-described embodiment disclosed specifically, and various modifications or changes, combinations with existing techniques, and the like can be made without departing from description of the claims.

REFERENCE SIGNS LIST

10 Relation visualizing apparatus
101 Storage unit
102 Filtering unit
103 Graph generation unit
104 Regional information adding unit
111 Dialog content DB
112 Utterer information DB
113 Hosting information DB
114 Regional information DB

The invention claimed is:

1. A relation visualizing apparatus comprising:
a memory; and
a processor configured to:
receive, as an input, filter data and dialog content data representing a content of a dialog between a plurality of persons speaking about a plurality of predetermined topic items;
store at least a part of the dialog content data in a dialog content database, wherein the dialog content database stores the at least a part of the dialog content data indexed by the plurality of predetermined topic items for data retrieval;
extract, based on the filter data, a set of filtered dialog content data from the dialog content database, wherein the filter data specifies at least a type of data stored in the dialog content database and at least a predetermined topic item of the plurality of topic items for filtering;
generate, using the set of filtered dialog content data, graph data, wherein the graph data includes nodes and edges, wherein each node represents the predetermined topic item of the plurality of predetermined topic items, each edge represents a person of the plurality of persons in the dialog, each edge connects two nodes of the plurality of nodes, and the nodes and edges collectively indicate a relationship among the plurality of predetermined topic items and the plurality of persons speaking about respective predetermined topic items of the plurality of predetermined topic items; and
display, based on the generated graph data, a graph, wherein the graph visually illustrates the relationship among the plurality of predetermined topic items and the plurality of persons speaking about respective predetermined topic items of the plurality of predetermined topic items.

2. The relation visualizing apparatus according to claim 1, wherein
the plurality of predetermined topic items is at least a part of a predetermined topic item group of a plurality of predetermined topic item groups, and
the processor generates a Sankey diagram as a graph, wherein the graph includes a hierarchy of nodes and edges, the graph uses the predetermined topic item group as the hierarchy of nodes and edges, the plurality of predetermined topic items is at least a part of the predetermined topic item group, and the nodes in the hierarchy represent the topic item group.

3. The relation visualizing apparatus according to claim 1, wherein the processor is further configured to:
filter the dialog content data using hosting information data and utter information data, the host information data representing information of at least one of a hosting place and a hosting date of the dialog, and the utterer information data representing attribute information of the utterer; and
generate, based on the filtered dialog content data as input, the graph.

4. The relation visualizing apparatus according to claim 3, wherein
the hosting information data and the utterer information data are associated with the dialog content data, and the filter operation further comprises, in a predetermined sequence:
- filtering the hosting information data thereby filtering the dialog content data corresponding to the hosting information data,
- filtering the utterer information data thereby filtering the dialog content data corresponding to the utterer information data, and
- filtering the dialog content data.

5. A relation visualizing method executed by a computer including a memory and a processor, the relation visualizing method comprising:
- inputting filter data and dialog content data representing a content of a dialog between a plurality of persons speaking about to a plurality of predetermined topic items;
- storing at least a part of the dialog content data in a dialog content database, wherein the dialog content database stores the at least a part of the dialog content data indexed by the plurality of predetermined topic items for data retrieval;
- extracting, based on the filter data, a set of filtered dialog content data from the dialog content database, wherein the filter data specifies at least a type of data stored in the dialog content database and at least a predetermined topic item of the plurality of topic items for filtering;
- generating, using the set of filtered dialog content data, a graph data, wherein the graph data includes nodes and edges, wherein each node represents the predetermined topic item of the plurality of predetermined topic items, each edge represents a person of the plurality of persons in the dialog, each edge connects two nodes of the plurality of nodes, and the nodes and edges collectively indicate a relationship among the plurality of predetermined topic items and the plurality of persons speaking about respective predetermined topic items of the plurality of predetermined topic items; and
- displaying, based on the generated graph data, a graph, wherein the graph visually illustrates the relationship among the plurality of predetermined topic items and the plurality of persons speaking about respective predetermined topic items of the plurality of predetermined topic items.

6. A non-transitory computer-readable recording medium having stored therein a program causing a computer to operate as the relation visualizing apparatus described in claim 1.

* * * * *